(12) United States Patent
Hanson et al.

(10) Patent No.: US 9,236,777 B2
(45) Date of Patent: Jan. 12, 2016

(54) BOBBIN WOUND MOTOR

(75) Inventors: Matthew Sherman Hanson, Palatine, IL (US); Edmund Peter Henke, Jr., Lake Geneva, WI (US)

(73) Assignee: BISON GEAR & ENGINEERING CORP., St. Charles, IL (US)

( * ) Notice: Subject to any disclaimer, the term of this patent is extended or adjusted under 35 U.S.C. 154(b) by 301 days.

(21) Appl. No.: 13/440,753

(22) Filed: Apr. 5, 2012

(65) Prior Publication Data

US 2012/0256505 A1  Oct. 11, 2012

Related U.S. Application Data

(60) Provisional application No. 61/473,644, filed on Apr. 8, 2011.

(51) Int. Cl.
*H02K 3/24* (2006.01)
*H02K 3/28* (2006.01)
*H02K 1/00* (2006.01)
*H02K 3/52* (2006.01)

(52) U.S. Cl.
CPC .................. *H02K 3/28* (2013.01); *H02K 3/522* (2013.01); *H02K 2203/03* (2013.01)

(58) Field of Classification Search
None
See application file for complete search history.

(56) References Cited

U.S. PATENT DOCUMENTS

| | | | | | |
|---|---|---|---|---|---|
| 3,608,837 | A | * | 9/1971 | Panning et al. | 241/36 |
| 4,896,063 | A | * | 1/1990 | Roberts | 310/68 R |
| 5,266,916 | A | * | 11/1993 | Kijima | 336/160 |
| 5,317,300 | A | * | 5/1994 | Boesel | 336/96 |
| 6,011,339 | A | * | 1/2000 | Kawakami | 310/208 |
| 6,480,085 | B2 | * | 11/2002 | Chiang et al. | 336/198 |
| 6,555,942 | B1 | * | 4/2003 | Hsu | 310/208 |
| 6,864,667 | B2 | * | 3/2005 | Buening et al. | 322/90 |
| 6,870,292 | B2 | * | 3/2005 | Owada et al. | 310/194 |
| 7,893,805 | B2 | * | 2/2011 | Lu et al. | 336/198 |
| 2002/0011755 | A1 | * | 1/2002 | Shteynberg et al. | 310/184 |
| 2009/0127964 | A1 | * | 5/2009 | Yumoto et al. | 310/195 |
| 2011/0025163 | A1 | * | 2/2011 | Shiobara et al. | 310/198 |

* cited by examiner

*Primary Examiner* — Tran Nguyen
(74) *Attorney, Agent, or Firm* — Garlick & Markison; Timothy W. Markison

(57) ABSTRACT

A motor includes a rotor and a stator. The stator is operable to electromagnetically induce movement of the rotor and includes stator teeth and a motor-board. A stator tooth includes a core material, a plurality of winding segments, and a bobbin. The bobbin includes a core receptacle for mechanically engaging the core material, radial-orientated sections to support and electrically isolate the winding segments, and connectors for electrically coupling the winding segments. The motor-board includes electrical receptacles for electrically mating with the connectors for each of the winding segments and traces for coupling the winding segments to a power source.

20 Claims, 11 Drawing Sheets top view motor 10

BOBBIN WOUND MOTOR

CROSS REFERENCE TO RELATED PATENTS

The present U.S. Utility Patent Application is claiming priority pursuant to 35 U.S.C. §119(e) to U.S. Provisional Application No. 61/473,644, entitled "Bobbin Wound Motor," filed Apr. 8, 2011, which is incorporated herein by reference in its entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to electrical equipment and more particularly to electric motors.

2. Description of Related Art

As is known, there are various types of electric motors and an almost endless variety of uses for them. For instances, an electric motor may be an AC motor (e.g., synchronous or induction), a servo motor, a DC motor, or an electrostatic motor (e.g., magnetic motor) and may be used in applications that range from micro-electrical systems (MEMS), to food processing equipment, to household appliances, to power tools, to automobiles, to toys, to large manufacturing equipment, etc. Basically any electrically powered device that uses mechanical motion includes an electric motor.

Due to the vast uses of electric motors, they come in an almost endless variety of sizes, shapes, and power levels. For instance, the size of a MEMS motor is small enough to fit on an integrated circuit and supplies nano-watts of power, while a large manufacturing equipment motor may be tens of feet in diameter supplying hundreds of thousands of kilowatts of power. Note that power of electric motors is sometimes expressed in horsepower, where one horsepower equals 746 watts.

Regardless of the size, shape, and power level, many types of electric motors include a stator and a rotor. The stator includes coils that produce an electromagnetic field. The rotor includes a die cast squirrel cage assembly and/or magnets that, when in the presence of the electromagnetic field, causes the rotor to rotate. Often, the speed at which the shaft of the rotor rotates is not the desired speed of the device incorporating the motor. In these instances, the motor is coupled to a separate gearbox.

As is known, a gearbox provides a speed-torque conversion. For example, a gearbox may be used to slow the rotation down and increase the torque. As another example, a gearbox may be used to increase the speed of rotation and reduce the torque. In addition, a gearbox may be used to change the axis of rotation such as in a right angle gearbox.

When a motor and/or a gearbox are used in an agriculture application (e.g., irrigation equipment), it must be able to withstand constant exposure to water, agriculture chemicals, and/or other environmental conditions. For these applications, the motor is often encapsulated with a thermally conductive polymer. The geometry of the motor (in particular, the stator), however, impairs the penetration of the encapsulating material around the copper wire of the stator windings, which leaves small sections of the stator winding insulation unprotected by the encapsulating material that corrode over time and cause the motor to fail.

In an addition, motors that are powered by a single or three-phase power source use an insulating film between stator coils of different phases. The end-turns of a coil are formed in spike and block presses and then connected with metal crimp connector to lead wires, which are insulated with coated fiberglass tubing. Over time, such motors are subject to failure if varnish or insulating film fails due to a manufacturing variation (e.g., not perfectly positioned to insulate every portion of the coils) and/or if movement of the end turn wires causes internal shorting of the windings.

BRIEF DESCRIPTION OF THE SEVERAL VIEWS OF THE DRAWING(S)

FIG. 8A is a schematic diagram view of another embodiment of a Y-configuration of the coils of the stator in accordance with the present invention;

DETAILED DESCRIPTION OF THE INVENTION

Figure 1:
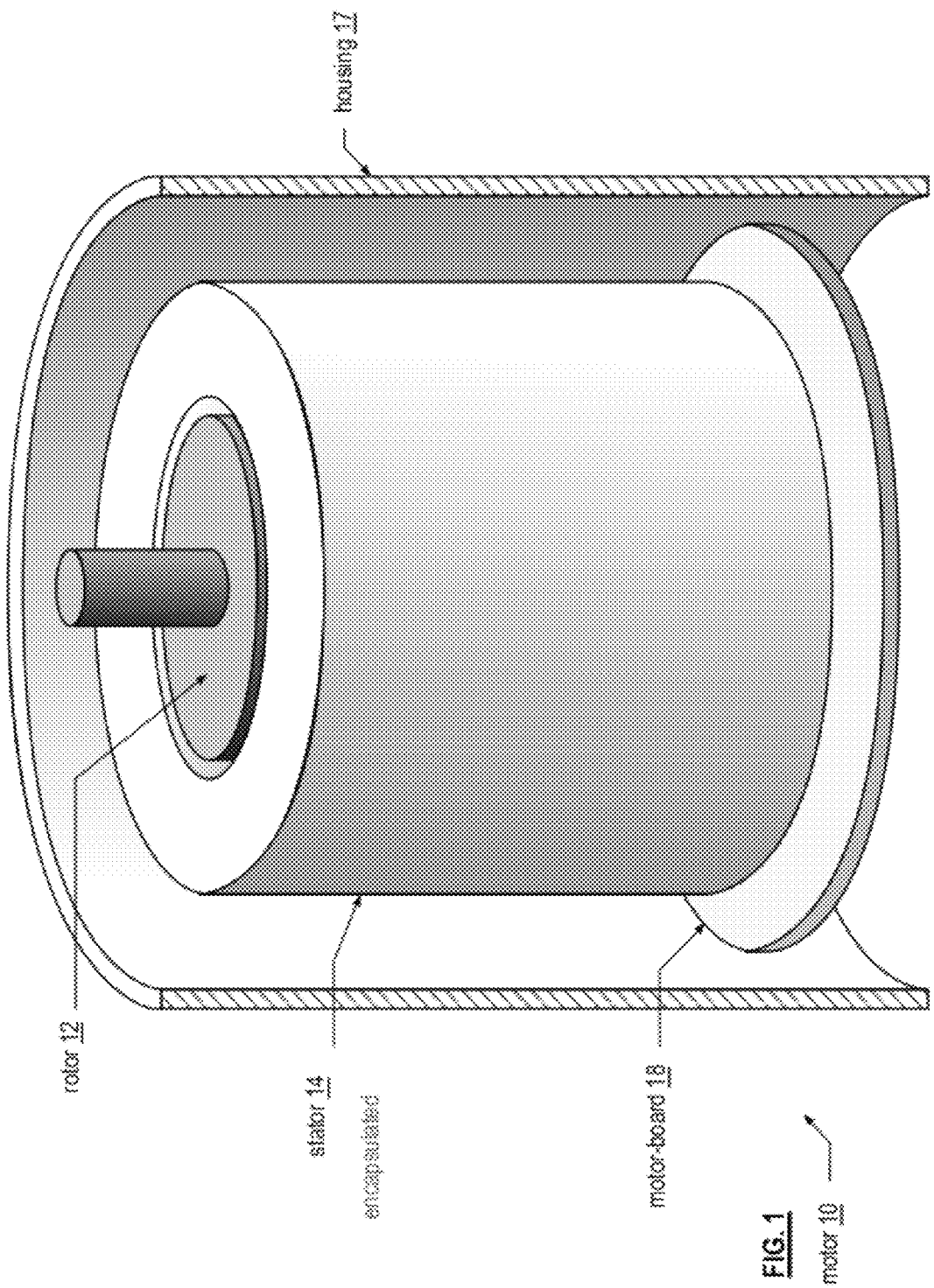
FIG. 1 is an isometric view diagram of an embodiment of a motor in accordance with the present invention.

FIG. 1 is an isometric view diagram of an embodiment of a motor 10 that includes a rotor 12, a stator 14, and a housing 17. The motor 10 may be used in a wide variety of applications including agricultural applications such as irrigation equipment. Accordingly, the motor 10 is able to withstand exposure to a variety of environmental conditions (e.g., rain, water, temperature, etc.) for many years.

The stator 14 includes a plurality of stator teeth (shown in subsequent figures) and a motor-board 18. Each of the stator teeth includes a bobbin assembly and corresponding core material (e.g., a ferrite, lamination set, T-shaped lamination, etc.). The bobbin assembly includes a bobbin and winding segments. The bobbin and core material have a geometry that allows for an encapsulating material (e.g., a thermal conductive epoxy or polymer that contains a heat conductive filler such as calcium or alumina powder) to completely or near completely encapsulate winding sections of the bobbin assembly that are not protected by the bobbin.

Each bobbin includes connectors, a core receptacle, and radial-orientated sections. The core receptacle mechanically engages the core material and the radial-orientated sections support and electrically isolate the winding sections from each other. The connectors are coupled to the leads of each of the winding segments and, when the stator teeth are positioned on the motor-board 18, the connectors mate with electrical receptacles on the motor-board 18. For instance, the winding segments are terminated with Amplivar-style female connectors (or similar) and the motor-board electrical receptacles are the corresponding male pins or posts. Such connectors and electrical receptacles enable consistent automated assembly thereby reducing the risk of lead failures due to isolating manufacturing inconsistencies.

The radial-orientated sections support the winding sections and include walls to electrically isolate the winding sections from each other. As such, the bobbin walls substantially eliminate phase-to-phase winding insulation failures.

Figure 2:
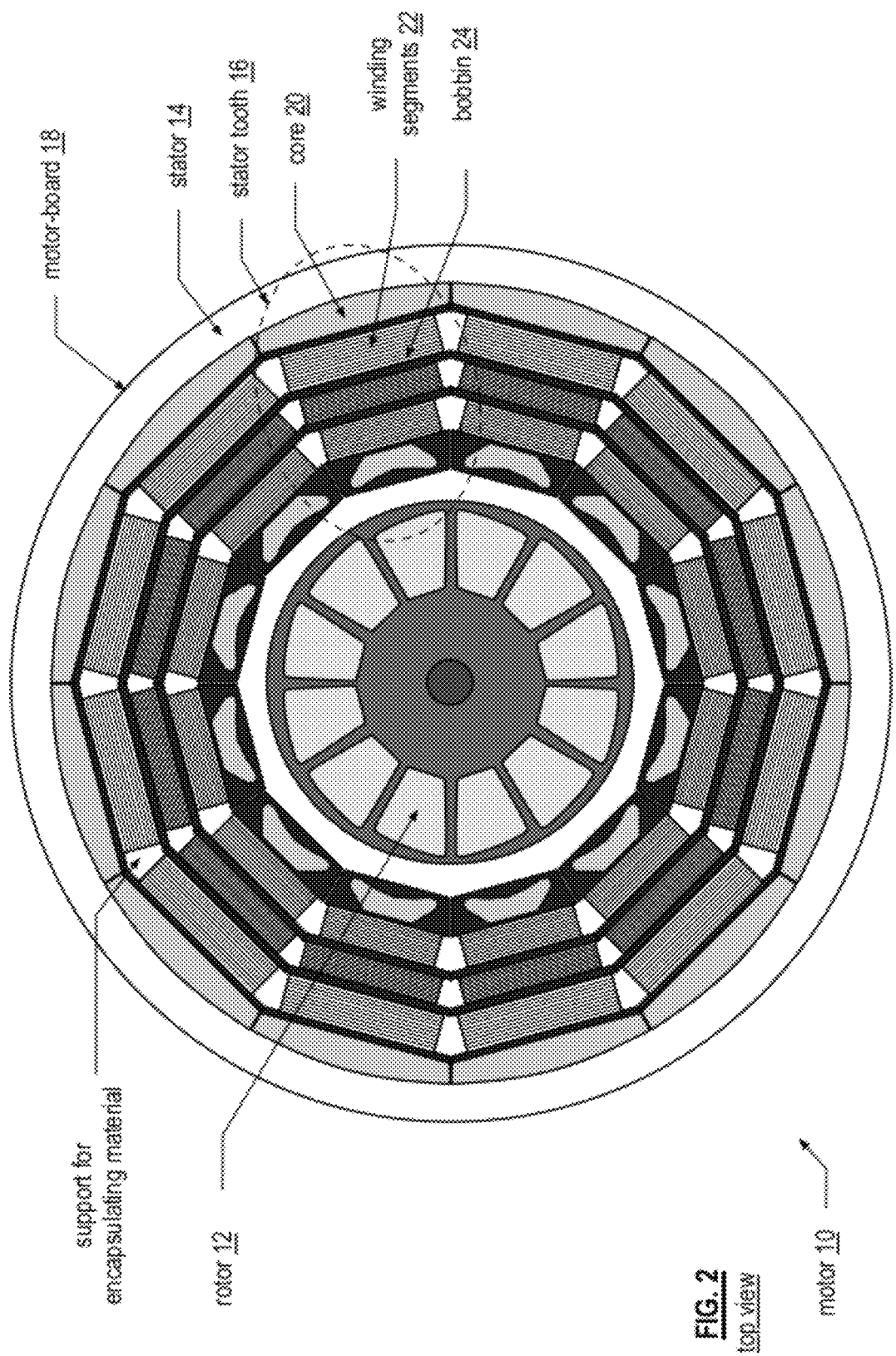
FIG. 2 is a top view diagram of an embodiment of a stator and a rotor of a motor in accordance with the present invention.

FIG. 2 is a top view diagram of an embodiment of a stator 14 and a rotor 12 of a motor 10. The rotor 12 includes a plurality of magnets and/or a plurality of conductors. The stator 14 includes a plurality of stator teeth 16 and a motor-board 18. Each stator tooth 16 includes a bobbin 24, winding segments 22, and a core 20. The bobbin 24 includes a core receptacle, a plurality of radial-orientated sections (e.g., sections between walls of the bobbin), and a plurality of connectors.

In the present example, the stator includes twelve stator teeth 16, each having a geometry (e.g. a trapezoidal shape from a top view perspective) that leaves gaps between the winding sections of adjacent stator teeth 16. The gaps are of sufficient size to allow an encapsulating material to penetrate them. In addition, each of the radial-orientated section is sized to contain a corresponding one of the plurality of winding segments and leave a portion of the isolating wall of the bobbin exposed. As such, the encapsulating material and the walls of the bobbin provide reliable and consistent isolation between the winding sections of a stator tooth and between winding sections of different stator teeth.

Each of the stator teeth 16 is coupled to the motor-board 18 by its connectors and corresponding electrical receptacles of the motor-board 18. The motor-board 18 further includes traces that couple the winding sections of the stator teeth to produce a three-phase, 2*n pole motor (where n is an integer equal to or greater than 1). Examples of various coupling of the winding segments will be further described with reference to one or more of FIGS. 6-12.

The motor-board 18 further includes traces that coupled a power source to one or more of the winding sections such that, when enabled, the stator 14 produces a rotating electromagnetic field (e.g., flux field, electrical field, and/or magnetic field). In the presence of the rotating electromagnetic field, the magnets and/or currents induced in the rotor bars cause the rotor 12 to rotate.

While the stator 14 of FIG. 2 is shown to include twelve stator teeth, alternate embodiments of the stator 14 may include more or less than twelve stator teeth. For example, the stator 14 may include six stator teeth (three to produce a north pole and three to produce a south pole). In another alternate embodiment, the stator may include eighteen stator teeth (each stator teeth per pole to produce a six pole (3 north and 3 south) motor. In either of these examples, the geometry of the bobbin may be adjusted to provide a desired gap between the winding sections of different stator teeth.

Figure 3:
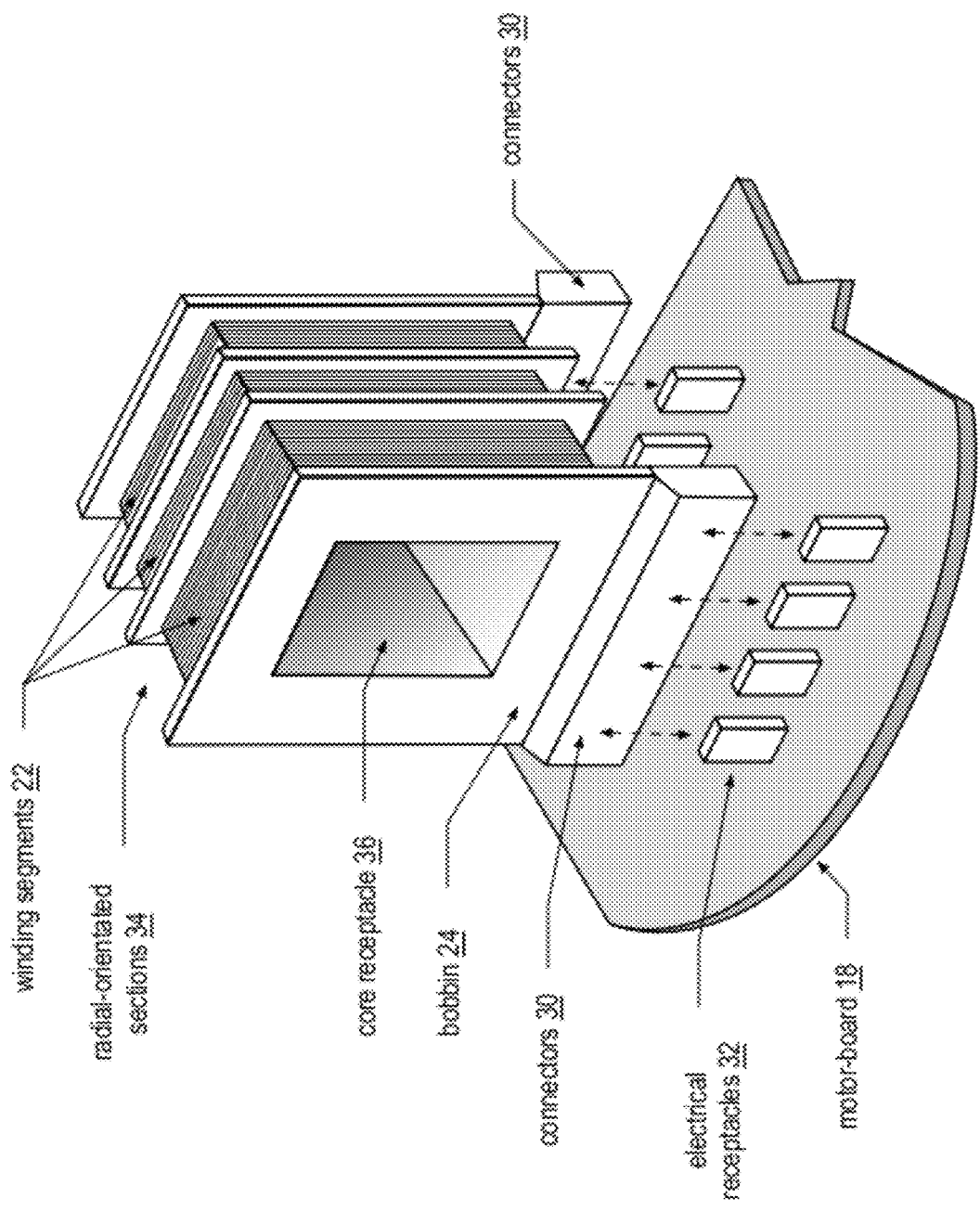
FIG. 3 is an isometric view diagram of an embodiment of a stator tooth bobbin and corresponding motor-board section in accordance with the present invention.

FIG. 3 is an isometric view diagram of an embodiment of a bobbin assembly and corresponding motor-board 18 section. The bobbin assembly includes the bobbin 24 and the plurality of winding segments 22. The bobbin 24 includes the radial-orientated sections 34, the core receptacle 36, and the connectors 30. The motor-board 18 includes traces (not shown) and electrical receptacles 32.

Each of the radial-orientated sections 34 includes bobbin walls and a base section that encircles the core receptacle area 36 and provides support for the corresponding winding segment 22. With such a bobbin, the winding segments 22 may be wound in the corresponding radial-orientated section 34 using an automated winding tool or other winding process. Accordingly, consistent dimensions of each winding segment 22 can be achieved, which leaves consistent dimensions for an encapsulating material to encapsulate the winding segments. Note that the bobbin is constructed of a non-conductive material, such as plastic, fiberglass, etc.

Figure 4:
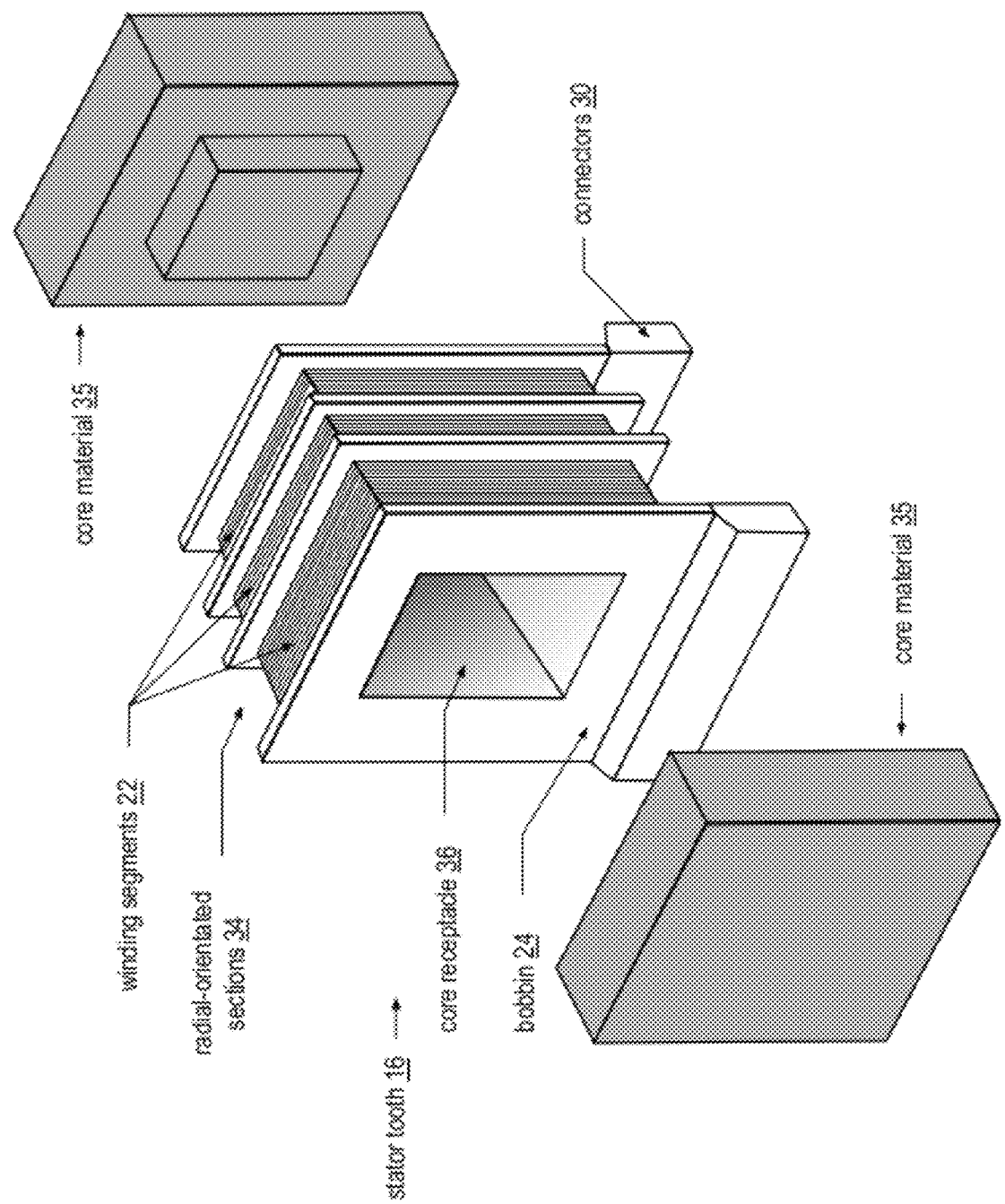
FIG. 4 is an exploded isometric view diagram of an embodiment of a stator tooth and bobbin assembly in accordance with the present invention.

FIG. 4 is an isometric view diagram of an embodiment of a stator tooth 16 that includes the bobbin assembly and the core material 35. The bobbin assembly includes the bobbin 24 and the plurality of winding segments 22. The core material 35 includes two sections that mate with the bobbin assembly via the core receptacle 36. In an example, one of the sections of the core includes an arm that passes through the core receptacle. The arm includes a mechanical engaging shape at the end that passes through the core receptacle 36 and the other section of the core material 35 includes a corresponding mating mechanical engaging shape. For instance, the sections of the core may be coupled together via dovetail joint.

Figure 5:
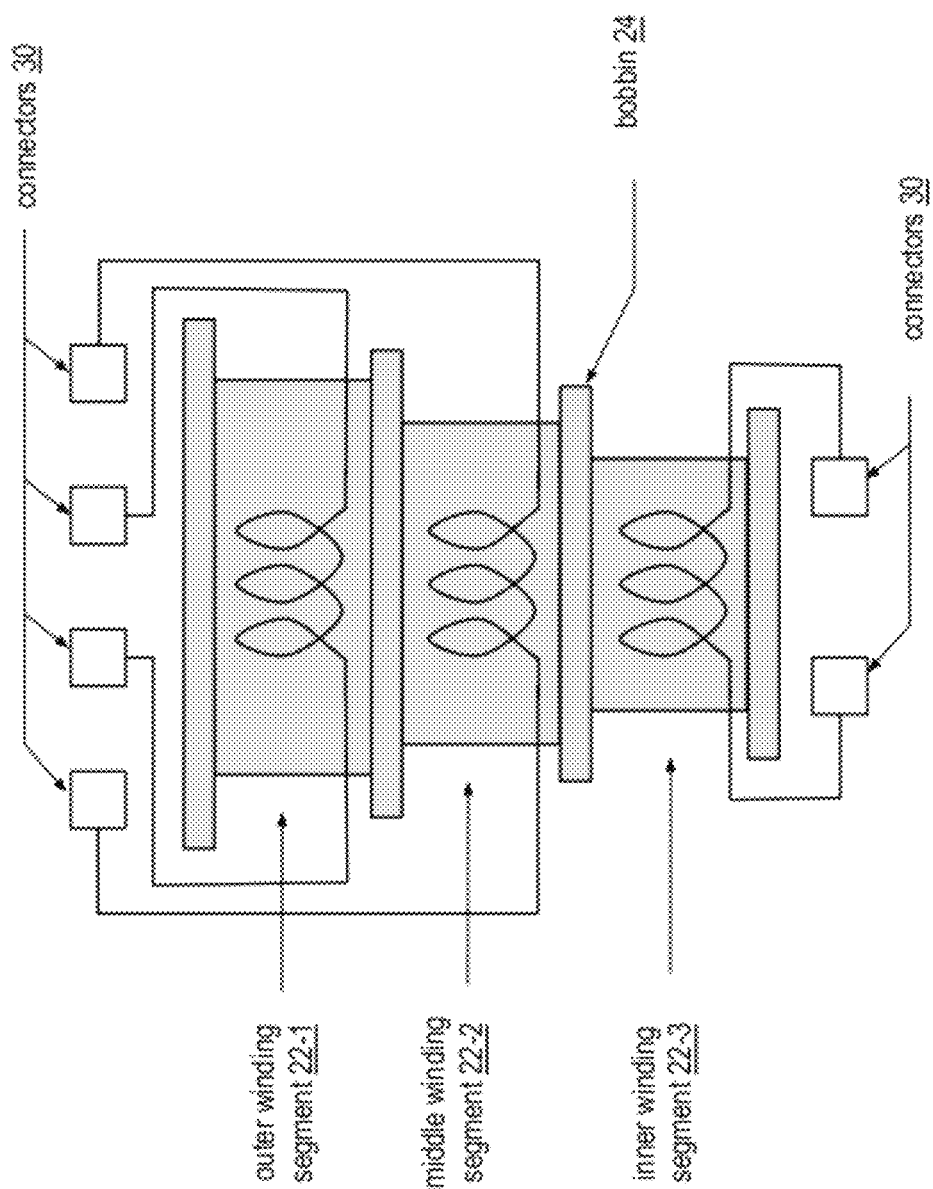
FIG. 5 is a schematic diagram view of an embodiment of a wound stator tooth in accordance with the present invention.

FIG. 5 is a schematic diagram view of an embodiment of a stator tooth 16 that includes the bobbin 24, the winding segments 22-1 through 22-3, and the connectors 30. As shown, the outer winding section 22-1 is coupled to one pair of connectors at the outer end of the bobbin; the middle winding section 22-2 is coupled to another pair of connectors at the outer end of the bobbin; and the inner winding 22-3 is coupled to a pair of connectors at the inner end of the bobbin.

Figure 6:
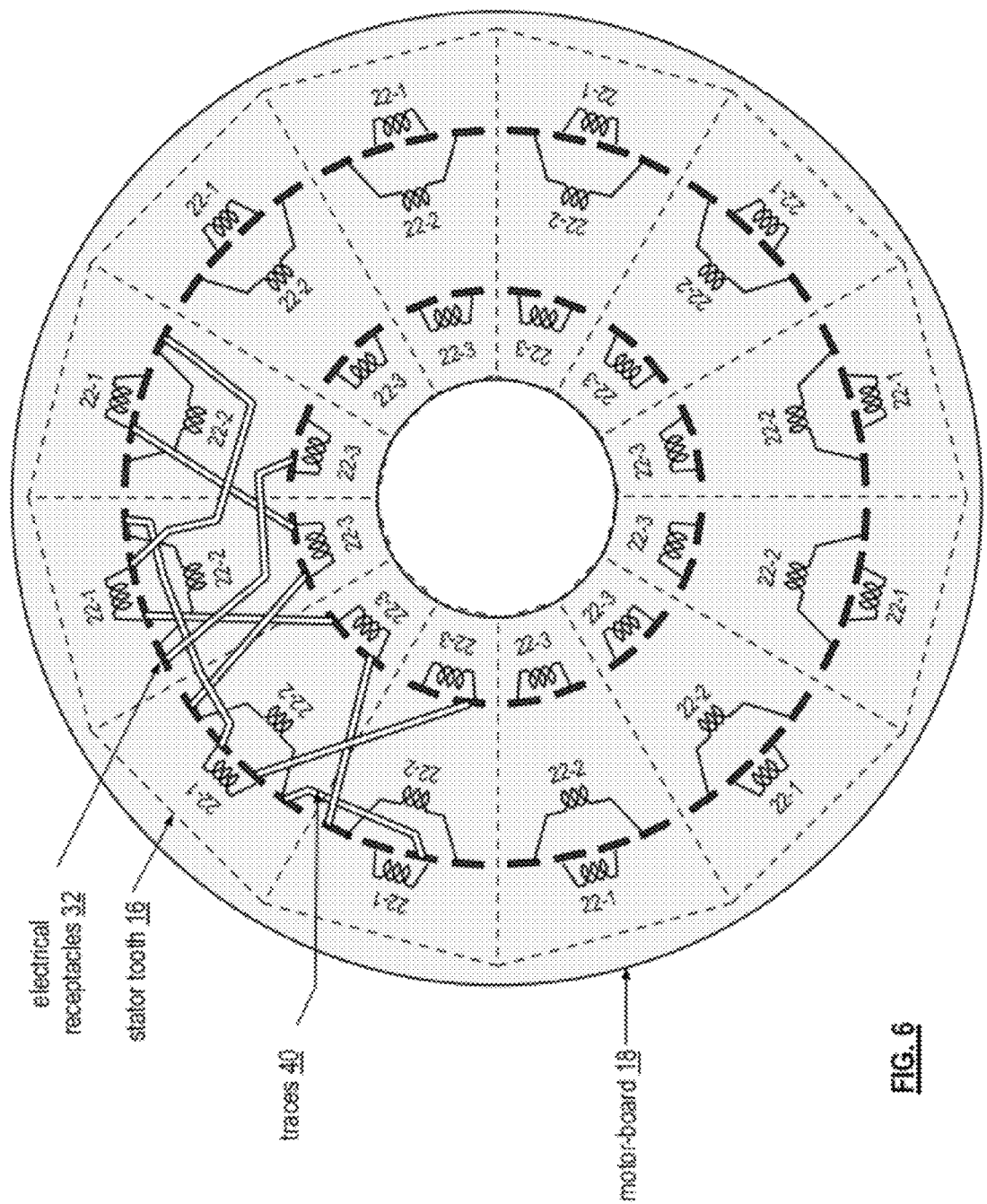
FIG. 6 is a schematic diagram view of an embodiment of a motor-board in accordance with the present invention.

FIG. 6 is a schematic diagram view of an embodiment of a motor-board 18 that includes a plurality of electrical receptacles 32 and a plurality of traces 40 (only some are shown). The electrical receptacles 32 are grouped and positioned to align with the connectors 30 of the stator teeth 16. In this diagram, the winding segments of a stator tooth 16 is represented by coils 22-1 through 22-3; where 22-1 represents the outer winding segment, 22-2 represents the middle winding segment, and 22-3 represents the inner winding. When the stator teeth are connected to the motor-board 18 via the electrical and mechanical coupling of the connectors and the electrical receptacles, the traces couple the winding segments of one stator tooth to winding segments of other stator teeth to produce the connections for the poles of the motor.

For example, the inner winding 22-3 of a first stator tooth is coupled to an outer winding 22-12 of a second stator tooth, which is coupled to a middle winding 22-2 of a third stator tooth as one pole of the first phase of the motor. Further, the middle winding 22-2 of the first stator tooth is coupled to the inner winding of the second stator tooth, which is coupled to the outer winding 22-1 of the third stator tooth as part of one pole of the second phase of the motor. Still further, the outer winding 22-1 of the first stator tooth 16 is coupled to the middle winding 22-2 of the second stator tooth, which is coupled to the inner winding 22-3 of the third stator tooth as part of one pole of the third phase of the motor. The remaining winding segments are coupled in a similar manner.

In this example embodiment, three winding segments (e.g., a coil) are energized on three adjacent stator teeth to create a sinusoidal flux distribution in the air-gap. Note that the center coil would have more turns and higher flux density than the two adjacent coils. For instance, the middle winding segment includes a first number of turns (e.g., 83 turns); the outer winding segment includes a second number of turns (e.g., 42 or less turns); and the inner segment includes a third number of turns (e.g., 42 turns). As such, the first number of turns is greater than the second number of turns, which is equal to the third number of turns.

Figure 7:
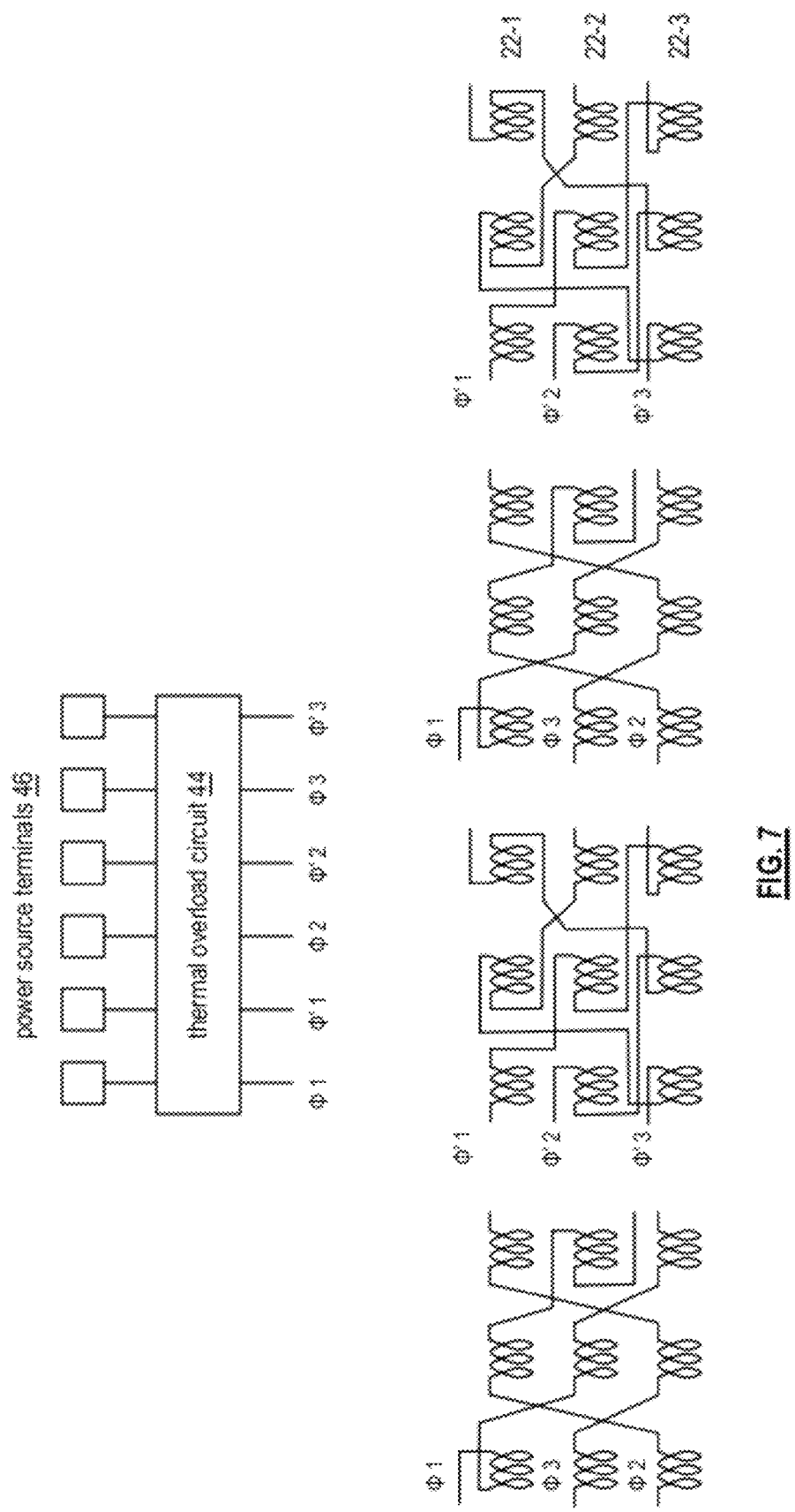
FIG. 7 is a schematic diagram view of an embodiment of a stator in accordance with the present invention.

FIG. 7 is a schematic diagram view of an embodiment of a stator that includes a plurality of stator teeth, a thermal overload circuit 44 (which is optional), and a plurality of power source terminals 46. Each stator tooth includes three winding segments that are presented as inductors 22-1 through 22-3. The winding segments of a grouping of three stator teeth are coupled as discussed with reference to FIG. 6 and/or as discussed with reference to one or more of the subsequent figures.

The overload circuit 44, if included, functions to disconnect the power source from the stator in the event of an overload condition. The overload condition may be triggered by a current overload, a voltage surge, a thermal overload (e.g., temperature of motor exceeds a temperature threshold), and/or other overload condition. When the overload condition is resolved, or the overload circuit is reset, the overload circuit reconnects the power source to the stator. Note that the overload circuit may be placed within the motor, but outside of the encapsulating material of the stator.

The power source terminals 46 provide, or are coupled to, termination studs for coupling to the power source, where the termination studs extend outside of the encapsulating material to allow for coupling of the power source. With such an arrangement and coupling of stator teeth, poles are distributed between the same arc measurement of a traditionally wound motor. In addition, the motor provides for a variety of pole counts. For instance, in a three-phase configuration, a twelve-stator tooth embodiment allows for a two-pole configuration or a four-pole configuration.

Figure 8:
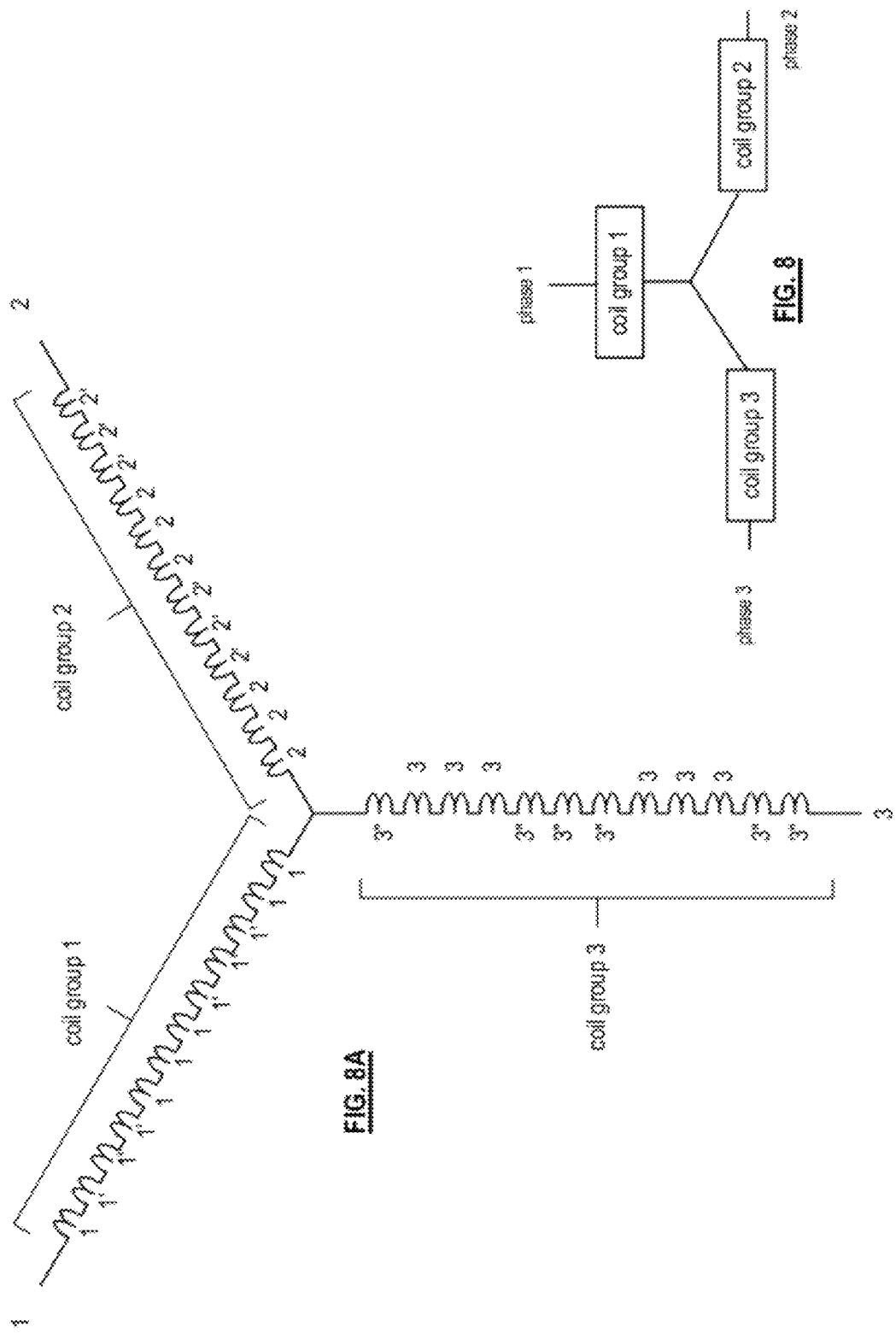
FIG. 8 is a schematic diagram view of an embodiment of a Y-configuration of the coils of the stator in accordance with the present invention.

FIG. 8 is a schematic diagram view of an embodiment of a stator that includes three phases connected in a Y-configuration. Each phase (i.e., coil groups 1, 2, and 3) includes four poles or coil groups, each with an inner winding 22-3 of a stator tooth coupled to an outer winding 22-1 of another stator tooth, which is coupled to a middle winding 22-2 of yet another stator tooth. In addition, each group of four poles is coupled to a separate phase of a three-phase power source. For example, the first group of four poles is coupled to a first phase, the second group of poles to a second phase, and the third group of poles connected to a third phase.

Figure 9:
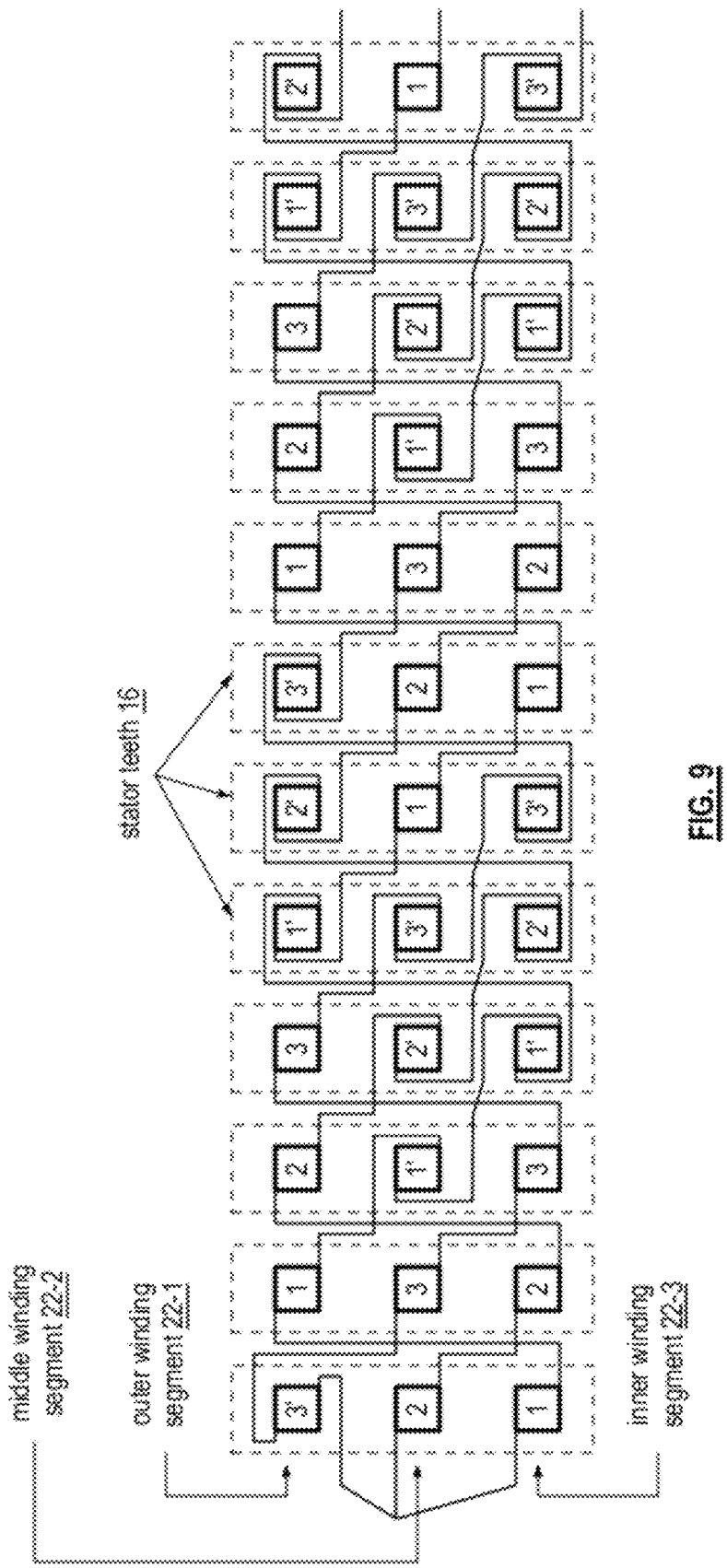
FIG. 9 is a schematic diagram view of another embodiment of coils of the stator in accordance with the present invention.

FIG. 8A is a schematic diagram view of an embodiment of a stator that includes three coil phases connected in a Y-configuration. Each of the three phases includes a plurality of inner, middle, and outer winding segments. With reference to FIGS. 8 and 9, FIG. 9 illustrates which inner winding segment, middle winding segment, and outer winding segment is part of which phase. For example, winding segments with a 1 or 1' designation are part of the first phase; winding segments with a 2 or 2' designation are part of the second phase; and winding segments with a 3 or 3' designation are part of the third phase.

The "prime" designation winding segments (e.g., 1', 2', and 3') indicates that the corresponding winding segment is coupled in a reverse manner than the non-prime designated segments (e.g., 1, 2, and 3). For instance, if the start of the winding segment (in FIG. 9) is the upper left corner and the end of the winding segment is the lower right corner, then the start of a non-prime designated winding segment is coupled to a winding segment to its left and the end of the non-prime designated winding segment is coupled to a winding segment to its right. Conversely, the start of a prime designated winding segment is coupled to a winding segment to its right and the end of the prime designated winding segment is coupled to a winding segment to its left. Note that the loose conductors of each phase at the end stator tooth are coupled together (e.g., the left end) or coupled to the phases (e.g., the right end). In this manner, the Y-configuration of FIG. 8 is achieved.

Figure 10:
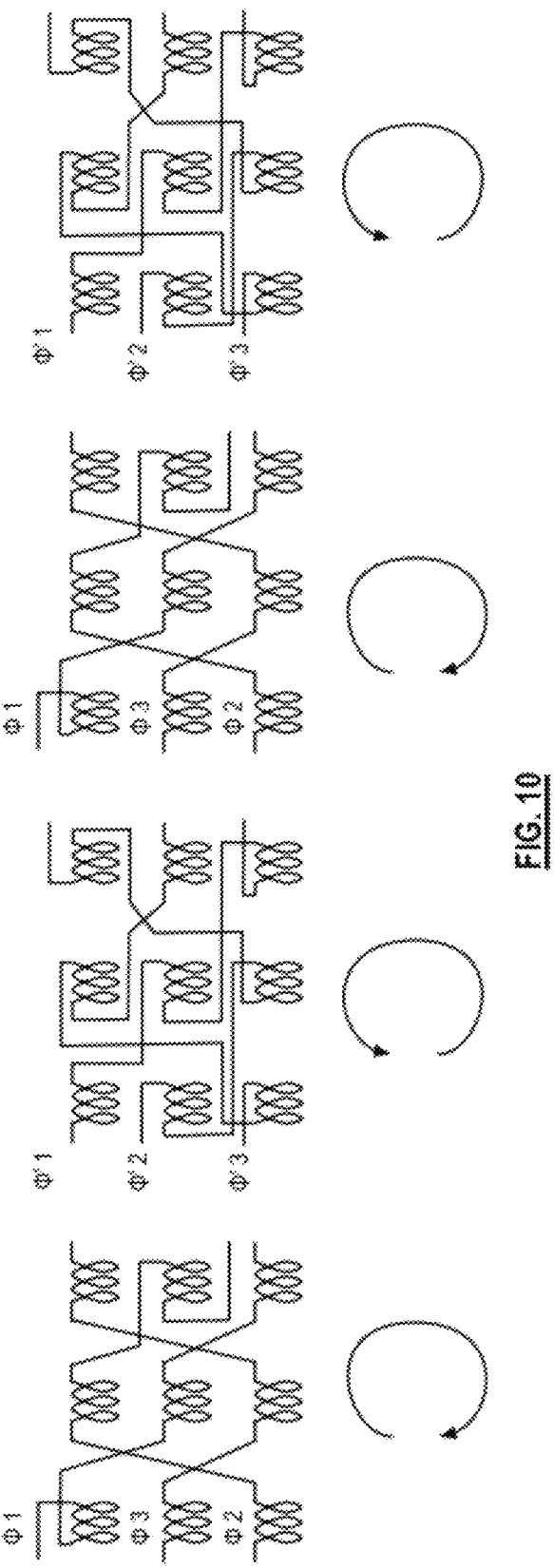
FIG. 10 is a schematic diagram view of another embodiment of coils of the stator in accordance with the present invention.

FIG. 10 is a schematic diagram view of another embodiment of a stator coupled in a three-phase four-pole configuration. In this configuration, a first grouping of three stator teeth is coupled to receive phase 1 of the power source to produce a first pole of the stator, creating a North or South pole, depending on the direction of current in the alternating current power supply. A second grouping of three stator teeth is coupled to receive phase 1 of the power source to produce a second pole of the stator, and since the windings are reversed from the first grouping, the magnetic pole created will be opposite the first grouping. A third grouping of three stator teeth is coupled to receive phase 1 of the power source to produce a third pole of the stator, with magnetic orientation equal to the first grouping; and a fourth grouping of three stator teeth is coupled to receive phase 1 of the power source to produce a fourth pole of the stator, with magnetic orientation equal to the second grouping.

The coupling of the groupings of three stator teeth to one another and/or to the power source may be done by traces on the motor-board. As such, the coil group positioned on three stator teeth forms a magnetic pole, and when coupled to a sinusoidal alternating wave form, create an alternating north and south pole.

Figure 11:
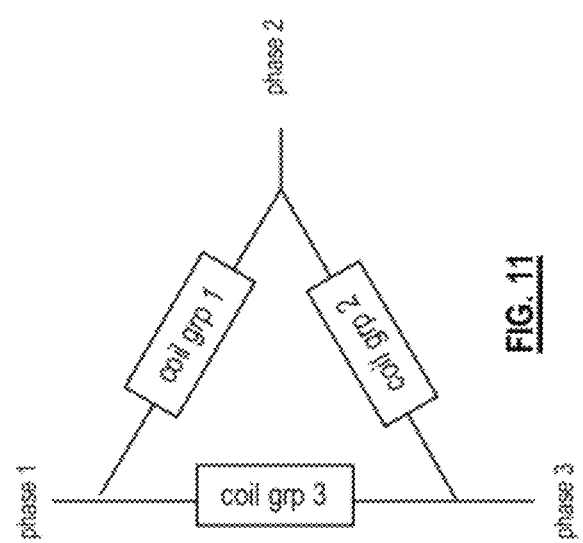
FIG. 11 is a schematic diagram view of an embodiment of a delta-configuration of the coils of the stator in accordance with the present invention.

FIG. 11 is a schematic diagram view of an embodiment of a stator that includes three phases connected in a delta-configuration. Each phase (i.e., coil groups 1, 2, and 3) includes four poles or coil groupings, each with an inner winding 22-3 of a stator tooth coupled to an outer winding 22-1 of another stator tooth, which is coupled to a middle winding 22-2 of yet another stator tooth. In addition, each group of four poles is coupled to a separate phase of a three phase power source. For example, the first group of four poles is coupled to a first phase, the second group of poles to a second phase, and the third group of poles connected to a third phase.

Figure 12:
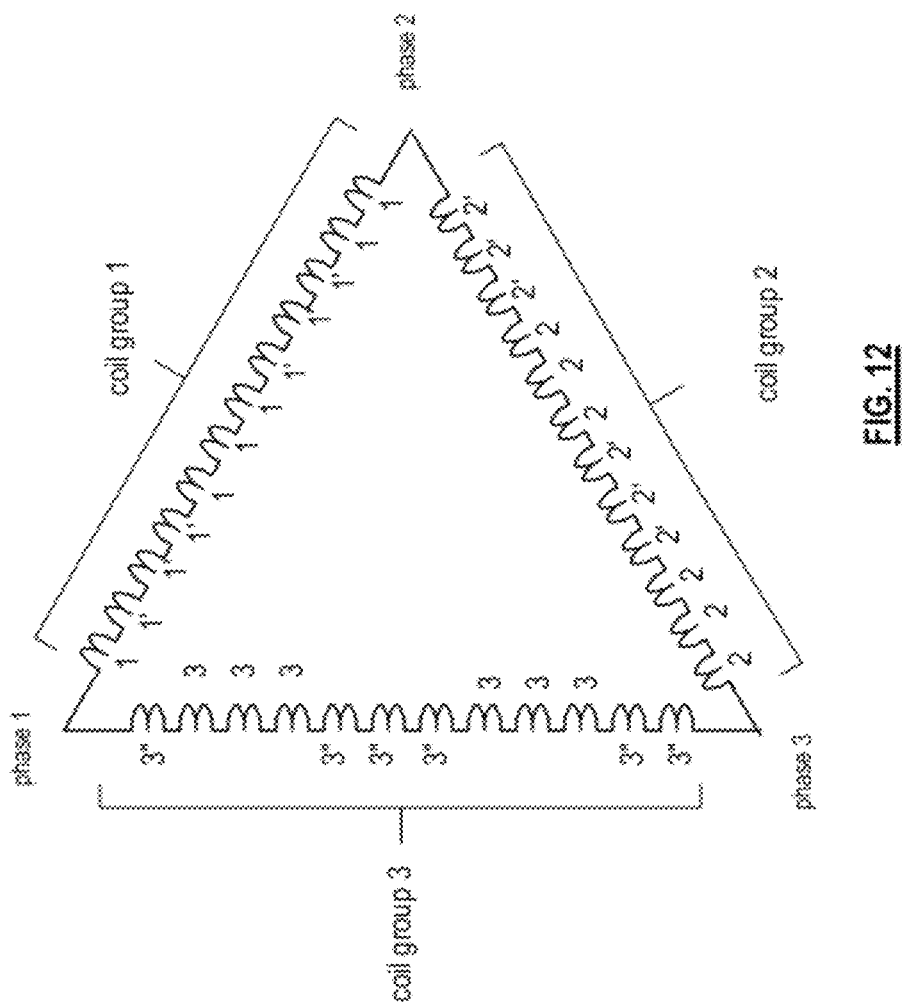
FIG. 12 is a schematic diagram view of another embodiment of a delta-configuration of the coils of the stator in accordance with the present invention.

FIG. 12 is a schematic diagram view of an embodiment of a stator that includes three phases connected in a delta-configuration. Each of the three phases includes a plurality of inner, middle, and outer winding segments. For example, winding segments with a 1 or 1' designation are part of the first phase; winding segments with a 2 or 2' designation are part of the second phase; and winding segments with a 3 or 3' designation are part of the third phase. The prime and non-prime designations were discussed with reference to FIGS. 8 and 9.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A motor comprises:
   a rotor disposed centrally within a cylindrical housing;
   a stator operable to electromagnetically induce movement of the rotor when powered, wherein the stator includes a plurality of stator teeth disposed cylindrically about the rotor and between the rotor and the cylindrical housing, wherein a respective stator tooth of the plurality of stator teeth includes:
      a bobbin that is non-conductive and disposed having a first surface facing toward the cylindrical housing and a second surface facing toward the rotor, wherein the bobbin has one or more walls disposed between the first surface and the second surface to form a plurality of radially-oriented sections, wherein the bobbin has a receptacle opening extending from the first surface to the second surface, in which the first surface, the second surface and the one or more walls are shaped to form a gap between an adjacent bobbin of an adjacent stator tooth of the plurality of stator teeth, and wherein the bobbin further has a core material that has a first portion disposed adjacent the first surface and a separate second portion adjacent the second surface, in which the core material extends through the receptacle opening to have the first and second portions meet utilizing a mechanical engaging shape; and
      a plurality of winding segments wound on the bobbin, in which the one or more walls of the bobbin separate respective winding segments and wherein the plurality of winding segments are coupled to a plurality of connectors formed on the bobbin; and
   a motor-board disposed at one end of the cylindrical housing and including:
      a plurality of electrical receptacles for electrically mating with the plurality of connectors; and
      a plurality of traces to couple one or more winding segments to one or more winding segments of a different stator tooth of the plurality of stator teeth or to a power source.

2. The motor of claim 1, wherein the bobbin further comprises:
   each of the radially-oriented sections of the respective stator tooth being of a size to contain a corresponding one of the plurality of winding segments and to support an encapsulating material that substantially encapsulates the winding segments.

3. The motor of claim 1, wherein the plurality of traces coupling the one or more winding segments comprises:
   coupling together winding segments of a first set of the plurality of stator teeth to produce a first magnetic pole; and
   coupling together winding segments of a second set of the plurality of stator teeth to produce a second magnetic pole.

4. The motor of claim 1, wherein the plurality of traces coupling the one or more winding segments comprises:
   coupling a first winding segment of a first one of the plurality of stator teeth to a second winding segment of a second one of the plurality of stator teeth; and
   coupling the second winding segment to a third winding segment of a third one of the plurality of stator teeth.

5. The motor of claim 4 further comprises:
   the first winding segment of the first one of the plurality of stator teeth having a first number of turns;
   the second winding segment of the second one of the plurality of stator teeth having a second number of turns; and the third winding segment of the third one of the plurality of stator teeth having a third number of turns, wherein the first number of turns equals the third number of turns, and the second winding segment has a greater number of turns than the first and third winding segments.

6. The motor of claim 1 further comprises:
termination studs mounted on the motor-board for coupling to the power source; and
an encapsulating material substantially encapsulates the stator, wherein a portion of the termination studs protrudes from the encapsulating material.

7. The motor of claim 1 further comprises:
a thermal overload circuit operable to disconnect the power source when the thermal overload circuit detects a thermal overload.

8. A stator to induce movement of a rotor of a motor when powered comprises:
a plurality of stator teeth disposed cylindrically about a central cylindrical opening for housing the rotor and the plurality of stator teeth configured for placement in a housing of the motor, wherein a respective stator tooth of the plurality of stator teeth includes:
a bobbin that is non-conductive and disposed having a first surface facing toward the housing and a second surface facing toward the rotor, wherein the bobbin has one or more walls disposed between the first surface and the second surface to form a plurality of radially-oriented sections, wherein the bobbin has a receptacle opening extending from the first surface to the second surface, in which the first surface, the second surface and the one or more walls are shaped to form a gap between an adjacent bobbin of an adjacent stator tooth of the plurality of stator teeth, and wherein the bobbin further has a core material that has a first portion disposed adjacent the first surface and a separate second portion adjacent the second surface, in which the core material extends through the receptacle opening to have the first and second portions meet utilizing a mechanical engaging shape;
a plurality of winding segments wound on the bobbin, in which the one or more walls of the bobbin separate respective winding segments and wherein the plurality of winding segments are coupled to a plurality of connectors formed on the bobbin.

9. The stator of claim 8, wherein the bobbin further comprises:
each of the radially-oriented sections of the respective stator tooth being of a size to contain a corresponding one of the plurality of winding segments and to support an encapsulating material that substantially encapsulates the winding segments.

10. The stator of claim 8, wherein the plurality of winding segments comprises:
a first winding segment having a first number of turns;
a second winding segment having a second number of turns; and
a third winding segment having a third number of turns, wherein the first number of turns is greater than the second number of turns and the second number of turns is greater than the third number of turns.

11. The stator of claim 8, wherein the bobbin has a trapezoidal foot print in a radial direction.

12. The motor of claim 1, wherein there are twelve stator teeth.

13. The motor of claim 1, wherein there are twelve stator teeth with each stator tooth having three winding segments.

14. The motor of claim 1, wherein each stator tooth has three winding segments, in which a separate phase of a three-phase power source is applied to the three winding segments.

15. The motor of claim 14, wherein the winding segments of the plurality of stator teeth are arranged in a Y-configuration with the three-phase power source.

16. The motor of claim 14, wherein the winding segments of the plurality of stator teeth are arranged in a delta-configuration with the three-phase power source.

17. The motor of claim 1, wherein an encapsulating material substantially encapsulates the stator and the encapsulating material is also present in the gap between adjacent stator teeth.

18. The stator of claim 8, wherein there are twelve stator teeth.

19. The stator of claim 8, wherein there are twelve stator teeth with each stator tooth having three winding segments.

20. The stator of claim 8, wherein each stator tooth has three winding segments, in which a separate phase of a three-phase power is applied to the three winding segments.

* * * * *